United States Patent [19]

Guasch

[11] Patent Number: 5,025,675
[45] Date of Patent: Jun. 25, 1991

[54] GEAR ASSEMBLY

[75] Inventor: Esteve C. Guasch, Barcelona, Spain

[73] Assignee: Bendix Espana S.A., Barcelona, Spain

[21] Appl. No.: 402,950

[22] Filed: Sep. 5, 1989

[51] Int. Cl.⁵ .............................................. F16H 1/94
[52] U.S. Cl. ........................................ 74/422; 74/498
[58] Field of Search ...................... 74/7 R, 422, 498; 29/525; 403/274, 282

[56] References Cited

U.S. PATENT DOCUMENTS 2,865,290 12/1958 Bonsper ........................... 403/282 X
3,818,768 6/1974 Hardy ................................ 74/7 R X
4,614,127 9/1986 Elser ..................................... 74/422

*Primary Examiner*—Allan D. Herrmann
*Assistant Examiner*—David W. Laub
*Attorney, Agent, or Firm*—Larry J. Palguta; Ken C. Decker

[57] ABSTRACT

A gear assembly, for example for use in a vehicle steering assembly, includes a rack and pinion system in which the output shaft is rotatably supported in eccentric bushings mounted in the gear housing. Rotation of the bushings relative to the housing changes the alignment of the output shaft. In order to lock the bushings in position relative to the housing, each includes a projection, for example a steel ball which engages and deforms the material of the housing and fixes the bushing in position. In an alternative embodiment the steel ball is mounted in the housing and engages and deforms the bushing.

4 Claims, 1 Drawing Sheet

GEAR ASSEMBLY

BACKGROUND OF THE INVENTION

The present invention relates to a gear assembly and, more particularly, to such a gear assembly which allows ease of adjustment of the relative position of its components. The invention is particularly applicable to gear assemblies for use in the steering of automotive vehicles.

A gear assembly of the rack and pinion type comprises a toothed nut located on a threaded input shaft so that rotation of the input shaft produces an axial displacement of the nut. The teeth of the nut engage with corresponding pinion teeth on an output shaft so that displacement of the rack nut produces a rotation of the output shaft. In such gear assemblies it is desirable to be able to adjust the relative positions of the rack and the pinion to ensure optimum engagement of the teeth.

The document U.S. Pat. No. 4,614,127 describes a rack and pinion gear assembly in which the output shaft is journaled in the housing by way of two eccentric bushings. Rotation of a bushing in the housing produces an angular displacement of the output shaft. Thus, by selected rotation of the bushings, the output shaft can be displaced to bring its teeth into optimum engagement with those of the rack. Once the optimum position of the bushings has been reached they are rotationally locked by punching part of the bushing into a corresponding notch in the housing. While this device ensures an optimum interengagement of the teeth, the locking of the bushings by punching is not completely satisfactory as the punching operation can cause undesirable displacement of the bushing.

The object of the present invention is to provide a gear assembly which allows optimum alignment of the gear components and in which the locking of the bushings is both simple and efficient.

SUMMARY OF THE INVENTION

According to the invention there is provided a gear assembly comprising a housing in which is displaceably mounted a toothed input member, a toothed output member rotatably mounted in the housing, the teeth of the input and output members interengaging each other so that a displacement of the input member produces a rotation of the output member, the assembly further comprising at least one eccentric bushing mounted in the housing and rotatably receiving an end of the output shaft, rotation of the eccentric bushing relative to the housing causing a change in the position of the output shaft, and securing means for locking the bushing in position relative to the housing, characterized in that the securing means comprises at least one projection on the bushing adapted to engage and deform a surface of the housing when the bushing is mounted in position in the housing.

BRIEF DESCRIPTION OF THE DRAWINGS

The present invention will now be described by way of example with reference to the accompanying drawings in which.

DESCRIPTION OF THE INVENTION

Figure 1:
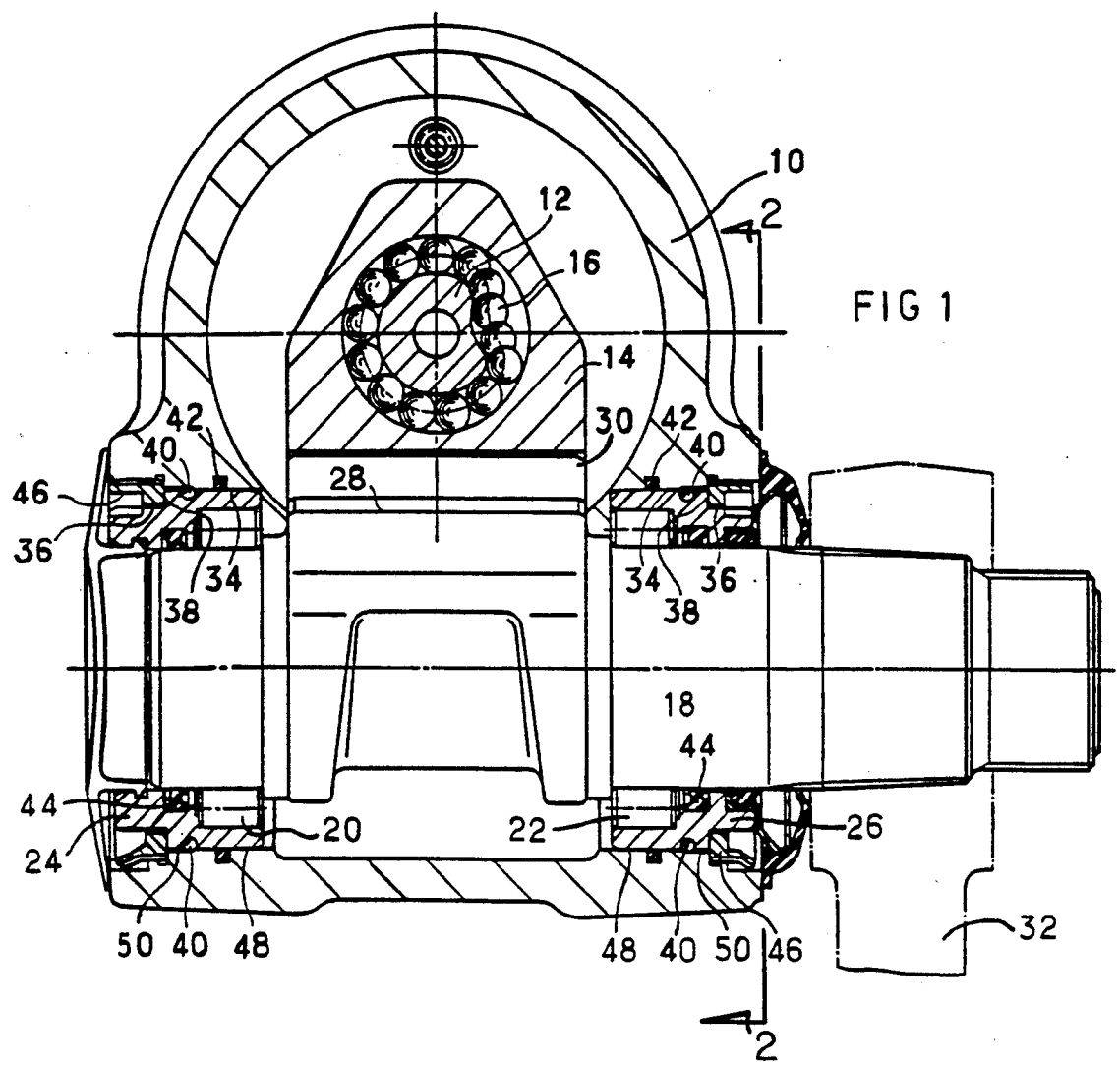
FIG. 1 is a sectional view taken through a gear assembly in accordance with the invention.
Figure 2:
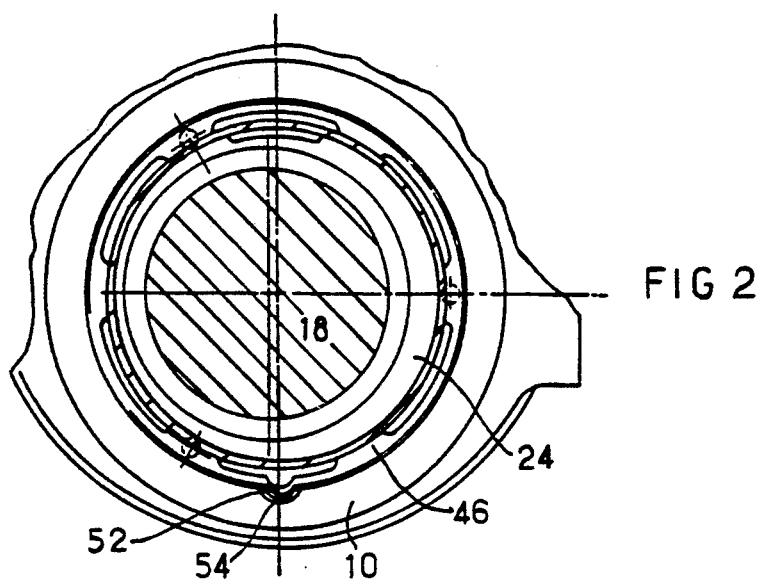
FIG. 2 is an end view taken in the direction of arrow 2-in FIG. 1.

A gear assembly which, in the illustrated example, is a rack and pinion steering assembly, comprises a housing 10 in which is rotatably mounted an input shaft 12 which is intended to be connected to the steering wheel of a vehicle (not shown). A toothed rack 14 is mounted on the input shaft 12 by means of a recirculating ball arrangement 16 in such a way that a rotation of the input shaft 12 produces a corresponding displacement of the rack 14.

An output shaft 18 is arranged in the housing 10 generally perpendicularly to the axis of the input shaft 12 and is rotatably mounted in two sets of roller bearings 20 and 22 each of which is located in a respective bushing 24 and 26 located in the housing 10 as will be described below in greater detail. The output shaft 18 is formed with teeth 28 which mesh with corresponding teeth 30 formed on the rack 14 in such a way that a displacement of the rack 14 produces a corresponding rotation of the output shaft 18 in a conventional way. The output shaft 18 is connected to a conventional steering linkage, partially shown 32.

The bushings 24 and 26 which support the roller bearings 20 and 22 are generally similar and each have a stepped cross-section comprising a cylindrical portion of larger diameter 34 and a portion of lesser diameter 36 linked by a radial shoulder 38. Each bushing 24, 26 comprises one or more metal balls 40 set into the surface of the larger diameter portion 34 adjacent the radial shoulder 38 such that a part of the ball 40 projects beyond the surface of the bushing 24, 26. In the event that more than one ball 40 is used on each bushing, either the balls 40 must be located in such a way that their arrangement has no rotational symmetry, or, alternatively, one of the balls 40 must be of a different size to the others. Annular seals 42 and 44 are provided on each bushing 24, 26 to seal the bushing with respect to the housing 10 and the output shaft 18 respectively. A threaded locknut 46 is screwed into the housing 10 adjacent each bushing 24, 26.

The assembly of the gear system in accordance with the invention is carried out as follows. Having mounted the input shaft 12 and the rack 14 in position in the housing 10 the output shaft 18 is located in position and the two bushings 24 and 26, with their associated roller bearings 20 and 22 are slid into position around the output shaft 18. Initially each bushing 24, 26 is pushed into its bore 48 in the housing 10 until the balls 40 are just adjacent, but have not yet entered, the bore 48, the balls 40 being arranged remote from the inward edge of the bushing. Each bushing 24, 26 is thus free to rotate in its bore 48. The alignment of the output shaft 18 is then varied by rotating the bushings 24, 26 in their bores 48 so as to arrive at the optimum engagement of the teeth 28 and 30 on the output shaft 18 and on the rack 14. Having located the optimum position for the bushings 24, 26, they are then locked into position simply by pressing them fully into the bore 48. As each ball 40 extends beyond the surface of the bushing it engages the wall of the bore 48 and forms a furrow 50 therein by plastic deformation of the metal of the housing. The interengagement of each ball 40 and its furrow 50 stops the bushing 24, 26 from rotating out of its chosen position. Each bushing 24, 26 is axially retained in position by its associated locknut 46 which is screwed into place after final location of the bushings 24, 26. In order to prevent undesired rotation of the locknut 46 a part 52 of its rim is punched into a notch 54 formed in the housing 10.

If subsequent maintenance of the gear assembly is required, the locknut 46 can be straightened and unscrewed and the bushing 24, 26 can be pulled from its bore 48. The replacement of the bushing 24, 26 in its previous position is ensured by realigning the ball 40 with its furrow 50. If, as described above, more than one ball 40 is used, the fact that they are assymetrically arranged means that there is only one possible position in which all the balls 40 are aligned with their furrows 50. Similarly, the use of one ball 40 of a different size would also ensure the correct replacement of the bushing 24, 26.

In any of the above cases, if it is desired to re-adjust the clearance it is a simple matter to select a new position for the bushing 24, 26 and press it into place in the bore 48 thus creating one or more new furrows 50.

It is envisaged that, in an alternative embodiment, the, or each, ball 40 be mounted in a corresponding opening in the bore 48, slightly to the inner side of the annular seals 42. In this case, each ball would engage and deform the outer surface of the bushing 24, 26.

I claim:

1. A gear assembly comprising a housing in which is displaceably mounted a toothed input member, a toothed output member rotatably mounted in the housing, the teeth of the input and output members interengaging each other so that a displacement of the input member produces a rotation of the output member, the assembly further comprising at least one eccentric bushing mounted in the housing and rotatably receiving an end of the output member, rotation of the eccentric bushing relative to the housing causing a change in the position of the output member, and securing means for locking the bushing in position relative to the housing, the securing means comprising at least one projection on the bushing and adapted to engage and deform a corresponding surface when the bushing is mounted in position in the housing, the bushing comprising a cylindrical surface received within a corresponding cylindrical surface in the housing, the projection comprising a ball set into the cylindrical surface of the bushing.

2. The gear assembly as claimed in claim 1, wherein the ball is arranged on the cylindrical surface of the bushing remote from an inward edge of the bushing.

3. A gear assembly comprising a housing in which is displaceably mounted a toothed input member, a toothed output member rotatably mounted in the housing, the teeth of the input and output members interengaging each other so that a displacement of the input member produces a rotation of the output member, the assembly further comprising at least one eccentric bushing mounted in the housing and rotatably receiving an end of the output member, rotation of the eccentric bushing relative to the housing causing a change in the position of the output member, and securing means for locking the bushing in position relative to the housing, the securing means comprising at least one projection on the bushing and adapted to engage and deform a corresponding surface when the bushing is mounted in position in the housing, the projection formed on the bushing and comprising a plurality of balls disposed in such a way that the balls are arranged rotationally asymmetrical.

4. A gear assembly comprising a housing in which is displaceably mounted a toothed input member, a toothed output member rotatably mounted in the housing, the teeth of the input and output members interengaging each other so that a displacement of the input member produces a rotation of the output member, the assembly further comprising at least one eccentric bushing mounted in the housing and rotatably receiving an end of the output member, rotation of the eccentric bushing relative to the housing causing a change in the position of the output member, and securing means for locking the bushing in position relative to the housing, the securing means comprising at least one projection on the bushing and adapted to engage and deform a corresponding surface when the bushing is mounted in position in the housing, the projection formed on the bushing and comprising a plurality of balls wherein one of the balls is of a size different from the other balls.

* * * * *